US012719787B2

(12) United States Patent
Zhang

(10) Patent No.: US 12,719,787 B2
(45) Date of Patent: Aug. 25, 2026

(54) COMMUNICATION CHIP AND DATA SWITCHING APPARATUS

(71) Applicant: HUAWEI TECHNOLOGIES CO., LTD., Shenzhen (CN)

(72) Inventor: Xianfu Zhang, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 44 days.

(21) Appl. No.: 19/028,210

(22) Filed: Jan. 17, 2025

(65) Prior Publication Data

US 2025/0168115 A1 May 22, 2025

Related U.S. Application Data

(63) Continuation of application No. PCT/CN2023/095556, filed on May 22, 2023.

(30) Foreign Application Priority Data

Jul. 18, 2022 (CN) ........................ 202210843102.4

(51) Int. Cl.
*H04L 45/60* (2022.01)
*H04L 49/111* (2022.01)
*H04L 49/112* (2022.01)

(52) U.S. Cl.
CPC ............ *H04L 45/60* (2013.01); *H04L 49/111* (2022.05); *H04L 49/112* (2022.05)

(58) Field of Classification Search
CPC ....... H04L 45/60; H04L 49/111; H04L 49/112
(Continued)

(56) References Cited

U.S. PATENT DOCUMENTS 10,243,882 B1 3/2019 Swarbrick et al.
10,708,127 B1 * 7/2020 Acharya .............. H04L 49/254
(Continued)

FOREIGN PATENT DOCUMENTS

CN 113079090 A 7/2021
CN 114116595 A 3/2022
(Continued)

OTHER PUBLICATIONS

International Search Report and Written Opinion in International Appln. No. PCT/CN2023/095556, mailed on Jul. 24, 2023, 17 pages (with English translation).

(Continued)

*Primary Examiner* — David P Zarka
(74) *Attorney, Agent, or Firm* — Fish & Richardson P.C.

(57) ABSTRACT

An example communication chip includes switching dies and network processing dies connected to the switching dies. A network processing die is configured to: receive a first packet via an external port, and send a second packet via an internal port, where the second packet includes the first packet and destination information indicating a destination network processing die of the first packet. A switching die is configured to: receive the second packet, and send the second packet to a connected switching die when determining, based on the destination information, that a preset condition is not satisfied, or send the second packet to a connected first network processing die when determining that the preset condition is satisfied. The first network processing die is configured to: receive the second packet, and send the second packet to outside, or send the second packet to another network processing die.

20 Claims, 9 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2002/0181452 | A1 | 12/2002 | Norman et al. | |
| 2011/0010525 | A1* | 1/2011 | Binkert | G06F 15/7825 712/E9.002 |
| 2018/0041434 | A1* | 2/2018 | Florea | H04L 49/901 |
| 2018/0048562 | A1* | 2/2018 | Meyer | H04L 49/109 |
| 2022/0337505 | A1* | 10/2022 | Zhao | H04L 45/24 |
| 2023/0421479 | A1* | 12/2023 | Zhao | H04L 45/566 |
| 2025/0055812 | A1* | 2/2025 | Zhang | H04L 49/15 |

FOREIGN PATENT DOCUMENTS

| | | | | | |
|---|---|---|---|---|---|
| CN | 115514704 | A | | 12/2022 | |
| CN | 115529269 | A | * | 12/2022 | H04L 49/109 |
| EP | 4195617 | A1 | * | 6/2023 | H04L 49/15 |
| EP | 4228210 | A1 | * | 8/2023 | H04L 49/102 |
| JP | 2013258299 | A | | 12/2013 | |
| KR | 101802810 | B1 | * | 11/2017 | H04L 45/60 |
| WO | WO-2022094771 | A1 | * | 5/2022 | H04L 49/102 |

OTHER PUBLICATIONS

Extended European Search Report in European Appln. No. 23841894.1, mailed on Sep. 8, 2025, 12 pages.

* cited by examiner

COMMUNICATION CHIP AND DATA SWITCHING APPARATUS

CROSS-REFERENCE TO RELATED APPLICATIONS

This application is a continuation of International Application No. PCT/CN2023/095556, filed on May 22, 2023, which claims priority to Chinese Patent Application No. 202210843102.4, filed on Jul. 18, 2022. The disclosures of the aforementioned applications are hereby incorporated by reference in their entireties.

TECHNICAL FIELD

This application relates to the field of communication technologies, and in particular, to a communication chip and a data switching apparatus.

BACKGROUND

A router (router) is a hardware device connecting two or more networks and serving as a gateway between the networks. The router is a network device that can read a destination address in a data packet and determine how to transfer the data packet. The router can identify different network protocols, translate destination addresses of data packets of different network protocols, and send the data packets to specified locations along optimal routes according to corresponding routing algorithms.

Currently, as shown in FIG. 1, the router includes a plurality of network processing (network processing, NP) chips (chips) and a plurality of switching (switching, SW) chips, the plurality of NP chips are respectively disposed on a plurality of line cards (line cards, LCs), and the plurality of switching chips are disposed on a backplane (backplane, BP). A board-level serial (SerDes) interface is further disposed on the backplane, and the plurality of line cards are connected to the plurality of switching chips on the backplane via the board-level serial interface. The NP chip may be configured to receive data from an external network and forward the data to the switching chip, or receive data outputted by the switching chip and forward the data to the external network. The switching chip is configured to receive the data forwarded by the NP chip, perform data switching, and send the data to a corresponding NP chip.

However, a manner of connecting the plurality of line cards to the plurality of switching chips on the backplane via the board-level serial interface causes problems of high power consumption, high costs, and a large volume of the router.

SUMMARY

This application provides a communication chip and a data switching apparatus, to reduce power consumption, costs, and a volume of a data switching network.

To achieve the foregoing objectives, this application uses the following technical solutions.

According to a first aspect, a communication chip is provided. The communication chip includes: a plurality of switching dies and a plurality of network processing dies. Any one of the plurality of switching dies is connected to another switching die to implement distributed switching. Any one of the plurality of network processing dies includes an external port and an internal port, and the internal port is connected to another network processing die, or is connected to both another network processing die and one of the plurality of switching dies. Any one of the plurality of network processing dies is configured to: receive a first packet from outside of the communication chip via the external port, obtain destination information of the first packet, and send a second packet via the internal port. The second packet includes the first packet and the destination information, and the destination information indicates a destination network processing die of the first packet. For example, the destination information is a destination address or an identifier of the destination network processing die. Any one of the plurality of switching dies is configured to: receive the second packet, and send the second packet to a connected switching die when determining, based on the destination information, that a preset condition is not satisfied, or send the second packet to a connected first network processing die when determining that the preset condition is satisfied. The first network processing die is configured to: receive the second packet from the connected switching die, and send the second packet to the outside via the external port, or send the second packet to the another network processing die via the internal port. The preset condition includes: a switching die in the plurality of switching dies that is connected to the destination network processing die, or a switching die that is connected to the destination network processing die via the another network processing die and that is connected to a minimum quantity of connected network processing dies.

In the foregoing technical solution, the communication chip includes the plurality of switching dies and the plurality of network processing dies. The plurality of switching dies and the plurality of network processing dies may be connected in the communication chip. In addition, the plurality of network processing dies may be configured to receive a packet from the outside or send the packet to the outside, and the plurality of switching dies may be configured to implement packet distributed switching, so that data switching is implemented inside the communication chip. In comparison with those of a data switching network including a plurality of network processing chips and a plurality of switching chips in the conventional technology, a volume and power consumption can be greatly reduced, and heat dissipation costs and deployment space of a device using the communication chip can be reduced, to meet a current requirement for green, low-carbon, and sustainable development.

In a possible implementation of the first aspect, the plurality of switching dies include a first switching die and a second switching die. The second switching die is connected to the first switching die. The first switching die is closest to a source network processing die, and the second switching die is closest to the destination network processing die. The first switching die is configured to: receive the second packet, and send the second packet to the second switching die when determining, based on the destination information, that the first switching die does not satisfy the preset condition. The second switching die is configured to: receive the second packet from the first switching die, and send the second packet to the first network processing die when determining, based on the destination information, that the second switching die satisfies the preset condition. In the foregoing possible implementation, when a first switching die closest to a source network processing die of a packet and a second switching die closest to a destination network processing die of the packet are not connected, the first switching die may send the packet to the second switching die after receiving the packet, so that the second switching die switches the packet to the destination network processing die.

In a possible implementation of the first aspect, the plurality of switching dies further include a third switching die. The third switching die is connected to the second switching die. In other words, the first switching die, the second switching die, and the third switching die are sequentially connected. The first switching die is closest to the source network processing die, and the third switching die is closest to the destination network processing die. The second switching die is further configured to: send the second packet to the third switching die when determining that the second switching die does not satisfy the preset condition. The third switching die is configured to: receive the second packet from the second switching die, and send the second packet to the first network processing die when determining, based on the destination information, that the third switching die satisfies the preset condition. In the foregoing possible implementation, when a first switching die closest to a source network processing die of a packet and a third switching die closest to a destination network processing die of the packet are not connected, and both two switching dies are connected to the first switching die, the first switching die may send the packet to the second switching die after receiving the packet, and the second switching die sends the packet to the third switching die, so that the third switching die switches the packet to the destination network processing die.

In a possible implementation of the first aspect, there are at least two second switching dies that are in the plurality of switching dies and that are connected to both the first switching die and the third switching die. In other words, the first switching die is closest to the source network processing die, and the third switching die is closest to the destination network processing die. There are a plurality of transmission paths between the first switching die and the third switching die, and each transmission path corresponds to one second switching die. The first switching die is specifically configured to: send the second packet to one of the at least two second switching dies when sending the second packet to the second switching die. In the foregoing possible implementation, when there are the plurality of transmission paths between the first switching die and the third switching die, the first switching die can flexibly select one of the second switching dies to send the second packet, thereby avoiding a problem that packet transmission delay is long due to congestion of some transmission paths.

In a possible implementation of the first aspect, any one of the plurality of switching dies is further configured to: send path indication information to the first network processing die when sending the second packet to the first network processing die. The path indication information indicates a sending path of the second packet, to control transmission of the second packet in the first network processing die. The first network processing die is further configured to: receive the path indication information, and send the second packet to the outside based on the path indication information via the external port, or send the second packet to the another network processing die based on the path indication information via the internal port In the foregoing possible implementation, when the first network processing die transmits the second packet, the switching die may control the sending path of the second packet in the first network processing die, to control the first network processing die to forward the packet to the destination network processing die, to avoid incorrect packet switching.

In a possible implementation of the first aspect, the first network processing die includes a first selector switch. The first selector switch includes a connection end, a first selection end, and a second selection end. The connection end of the first selector switch is connected to one of the plurality of switching dies, the first selection end of the first selector switch is connected to the external port, and the second selection end of the first selector switch is connected to the another network processing die. The first network processing die is further configured to: connect the connection end of the first selector switch to the first selection end of the first selector switch when sending the second packet to the outside based on the path indication information via the external port; or the first network processing die is further configured to: connect the connection end of the first selector switch to the second selection end of the first selector switch when sending the second packet to the another network processing die based on the path indication information via the internal port. In the foregoing possible implementation, the switching die controls different selection ends of the first selector switch in the first network processing die, to control the first selector switch to forward the packet to the destination network processing die, to avoid incorrect packet switching.

In a possible implementation of the first aspect, the first selector switch includes at least two second selection ends. The at least two second selection ends are respectively connected to at least two internal ports of the first network processing die, and the at least two internal ports are respectively connected to at least two of the plurality of network processing dies. The first network processing die is further configured to: when sending the second packet to the another network processing die based on the path indication information via the internal port, connect the connection end of the first selector switch to the second selection end corresponding to the sending path indicated by the path indication information. In the foregoing possible implementation, the switching die controls different selection ends of the first selector switch in the first network processing die, to select a corresponding transmission path to forward the packet to the destination network processing die.

In a possible implementation of the first aspect, the destination network processing die is not connected to any one of the plurality of switching dies. There are at least two first network processing dies that are in the plurality of network processing dies and that are connected to both the second switching die and the destination network processing die. The second switching die is further configured to: send the second packet to one of the at least two first network processing dies when sending the second packet to the first network processing die. In the foregoing possible implementation, when there are a plurality of transmission paths between the second switching die and the destination network processing die, the second switching die can flexibly select the first network processing die configured to forward the second packet, thereby avoiding a problem that packet transmission delay is long due to congestion of some transmission paths.

In a possible implementation of the first aspect, there is a second network processing die in the plurality of network processing dies that is not connected to any one of the plurality of switching dies. The second network processing die is specifically configured to: send the second packet to a third network processing die via the internal port after receiving the first packet via the external port and sending the second packet via the internal port. The third network processing die is connected to both one of the plurality of switching dies and the second network processing die. The third network processing die is configured to: receive the second packet, and forward the second packet to the switching die. In the foregoing possible implementation, when the second network processing die is not connected to any switching die, the second packet may be forwarded to a switching die via the third network processing die. Therefore, compared with conventional technologies, a corresponding wiring does not need to be disposed on the backplane, and a transmission path can be shortened, thereby reducing a delay and power consumption of transmitting the packet and the destination information.

In a possible implementation of the first aspect, there are at least two third network processing dies in the plurality of network processing dies. The second network processing die is specifically configured to: send the second packet to one of the at least two third network processing dies when sending the second packet to the third network processing die via the internal port. In the foregoing possible implementation, when there are a plurality of transmission paths between the second switching die and a switching die, the second switching die can flexibly select the third network processing die configured to forward the second packet, thereby avoiding a problem that packet transmission delay is long due to congestion of some transmission paths.

In a possible implementation of the first aspect, the second network processing die further includes a second selector switch. The second selector switch includes a connection end and at least two selection ends. The connection end of the second selector switch is connected to the external port, and the at least two selection ends of the second selector switch are respectively connected to the at least two third network processing dies. The second network processing die is further specifically configured to: connect the connection end of the second selector switch to one of the at least two selection ends, to send the second packet to one third network processing die selected from the at least two third network processing dies. In the foregoing possible implementation, when forwarding the second packet, the second network processing die may select different selection ends of the second selector switch, to flexibly select different third network processing dies to forward the packet to a switching die, thereby avoiding a problem that packet transmission delay is long due to congestion of some transmission paths.

In a possible implementation of the first aspect, the second network processing die is further configured to: send the first packet via the external port when the destination network processing die is the second network processing die. In the foregoing possible implementation, when the second network processing die receives the first packet via the external port, if the second network processing die is the destination network processing die of the first packet, the first packet is sent via the external port, so that transmission delay of the first packet can be reduced.

In a possible implementation of the first aspect, the communication chip includes a plurality of groups. Any one of the plurality of groups includes at least one of the plurality of network processing dies, and network processing dies in any two of the plurality of groups are not connected. At least one network processing die in a same group is connected to one of the plurality of switching dies in the same group via the internal port, or is connected to an adjacent network processing die in the same group via the internal port. In other words, when the plurality of network processing dies belong to the plurality of groups, network processing dies in the plurality of groups are not connected across groups. In the foregoing possible implementation, without affecting performance of the communication chip, cabling in the communication chip can be reduced, a transmission route in the communication chip can be further simplified, and processing efficiency can be improved, thereby reducing power consumption, a volume, and costs of the communication chip.

In a possible implementation of the first aspect, the plurality of switching dies and the plurality of network processing dies are located in a same wafer. In other words, there may be only one wafer in the communication chip, and the wafer includes the plurality of switching dies and the plurality of network processing dies. In the foregoing possible implementation, integration of the plurality of switching dies and the plurality of network processing dies can be improved, thereby further reducing a volume and power consumption of the communication chip.

In a possible implementation of the first aspect, the communication chip further includes: a plurality of storage dies, and any one of the plurality of network processing dies is connected to one or more of the plurality of storage dies. In the foregoing possible implementation, a network processing die is coupled to the one or more storage dies, so that in a data switching process, the storage die may be configured to buffer a corresponding switching packet, thereby improving a data switching capability of the communication chip to some extent.

According to a second aspect, a data switching apparatus is provided. The data switching apparatus includes a backplane and at least one communication chip disposed on the backplane, and the communication chip is the communication chip according to the first aspect or any one of the possible implementations of the first aspect.

In a possible implementation of the second aspect, the data switching apparatus includes a switching box or a switching frame.

In a possible implementation of the second aspect, when the data switching apparatus includes the switching frame, the switching frame includes at least one line card corresponding to the at least one communication chip, and the at least one communication chip is disposed on the backplane respectively by using the at least one line card.

According to a third aspect, a switching device is provided. The switching device includes the data switching apparatus according to the second aspect or any one of the possible implementations of the second aspect.

It may be understood that, for beneficial effects that can be achieved by any data switching apparatus and switching device provided above, correspondingly refer to beneficial effects in the communication chip provided above. Details are not described herein again.

DESCRIPTION OF EMBODIMENTS

Technical solutions in embodiments of this application are described below with reference to the accompanying drawings in embodiments of this application. In this application, "at least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. The character "/" generally represents an "or" relationship between the associated objects. "At least one of the following items (pieces)" or a similar expression means any combination of these items (pieces), including a single item (piece) or any combination of a plurality of items (pieces). For example, at least one item (piece) of a, b, or c may represent: a, b, c, a and b, a and c, b and c, or a, b, and c, where a, b, and c may be singular or plural. In addition, in embodiments of this application, terms such as "first" and "second" do not limit a quantity or an execution sequence.

It should be noted that, in this application, the terms such as "example" or "for example" represents giving an example, an illustration, or a description. Any embodiment or design solution described as "example" or "for example" in this application should not be construed as being preferred or advantageous over other embodiments or design solutions. In particular, the terms such as "example" and "for example" used herein are intended to present the related concept in a specific implementation.

Figure 1:
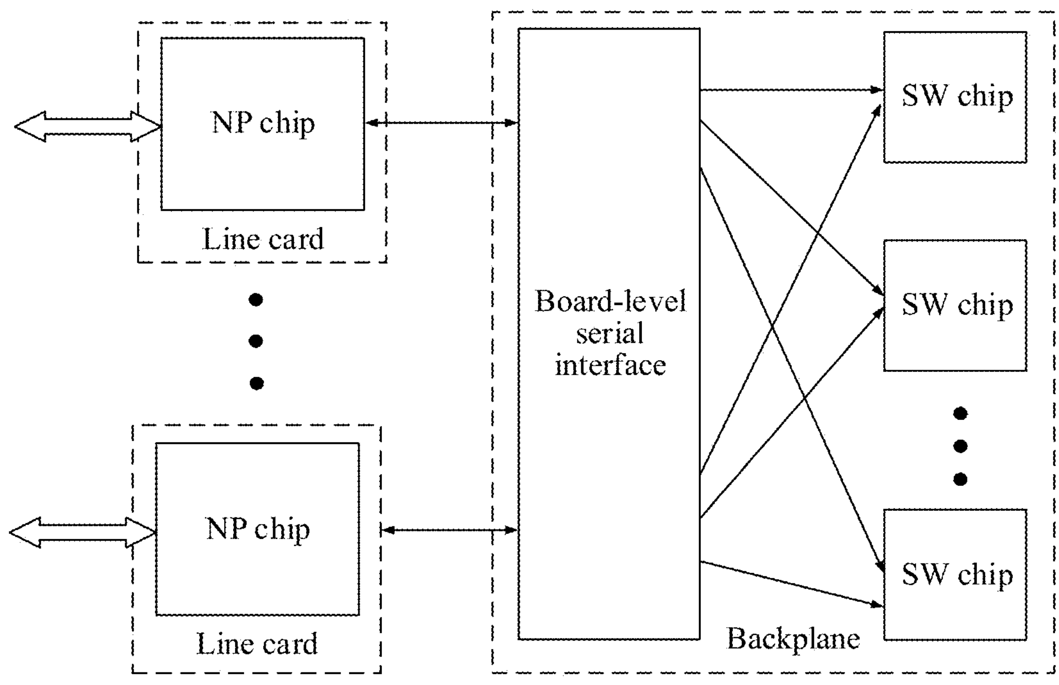
FIG. 1 is a diagram of a structure of a router according to the conventional technology.
Figure 2:
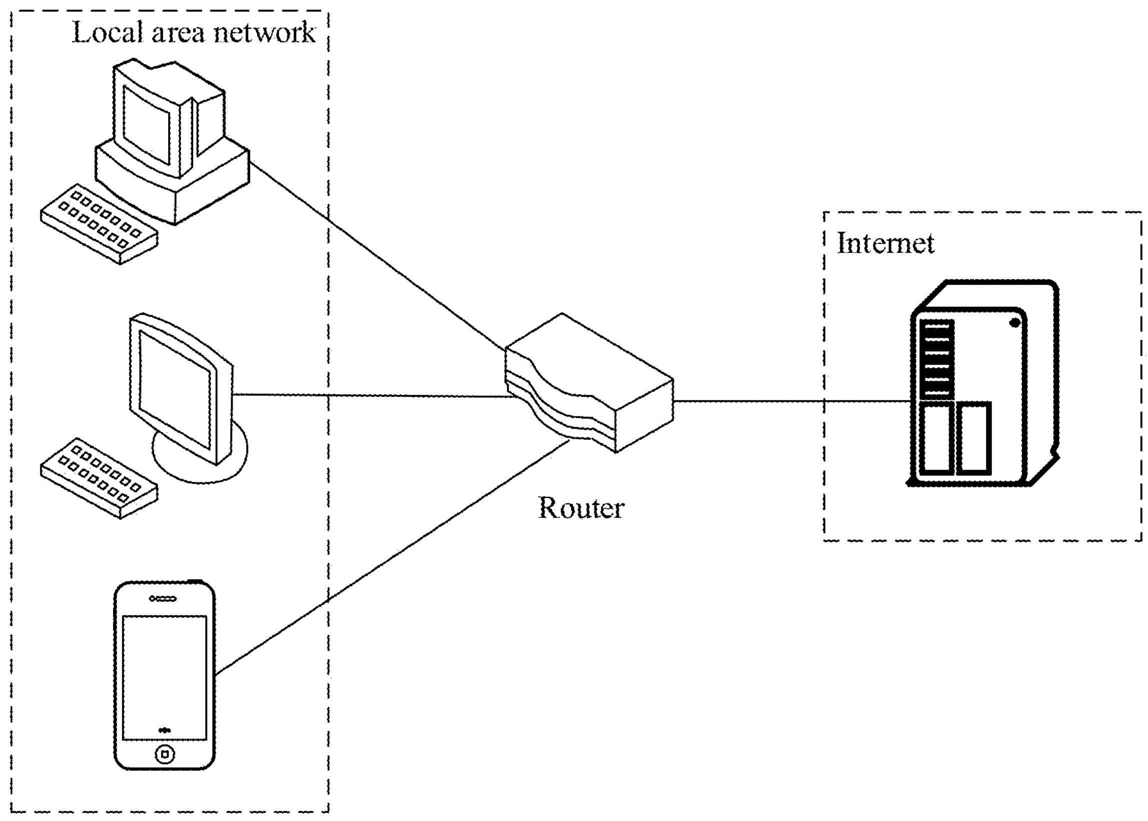
FIG. 2 is an application diagram of a data switching network according to an embodiment of this application.

The technical solutions provided in embodiments of this application may be applied to a plurality of different data switching networks. The data switching network may also be referred to as a data switching system, and may be configured to implement data switching between different devices in a same data network, or may be configured to implement data switching between different data networks. The data switching network may be a switch, a router, or a switching network including a plurality of switches or routers. For example, as shown in FIG. 2, different data networks may include a local area network and the Internet. The local area network and the Internet may perform data switching via the router. The local area network may include a mobile phone, a tablet computer, a personal computer, or other terminal devices. The Internet may include one or more servers. The following uses a structure of the data switching network as an example for description.

Figure 3:
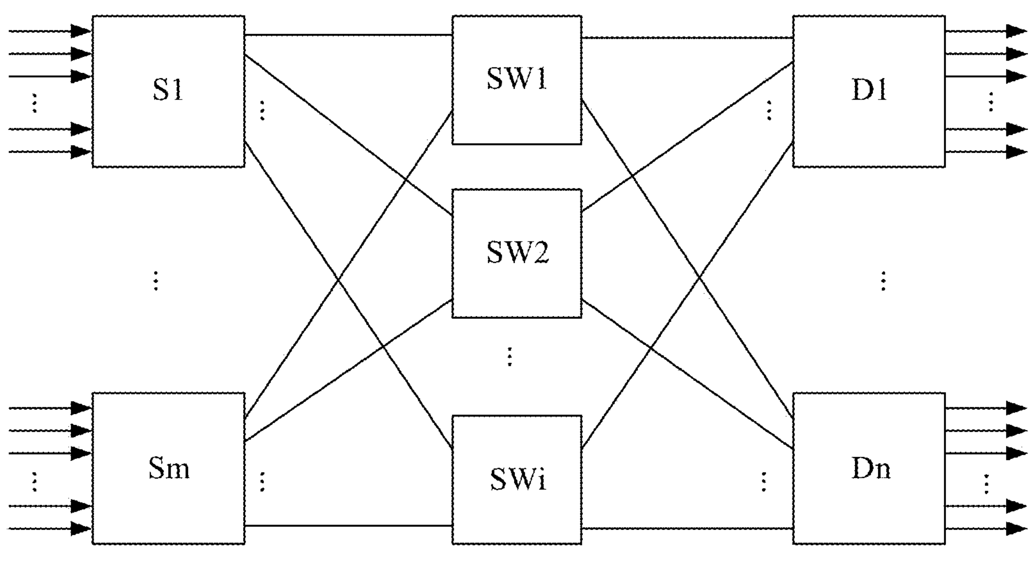
FIG. 3 is a diagram of a structure of a data switching network according to an embodiment of this application.

FIG. 3 is a diagram of a structure of an m×n (both m and n are integers greater than 1) data switching network according to an embodiment of this application. The data switching network includes m source nodes (source, S), n destination nodes (destination, D), and at least one switching node (switching, SW) located between the m source nodes S and the n destination nodes. In FIG. 3, the m source nodes S are represented as S1 to Sm, and the n destination nodes D are represented as D1 to Dn. An example in which the at least one switching node SW includes a plurality of switching nodes and the plurality of switching nodes are represented as SW1 to SWi is used for description.

In the data switching network, each of the m source nodes S and the n destination nodes D may include one or more ports. For the source node S, the one or more ports are input ports (input ports). The input port may be configured to receive a data packet or cell from outside of the switching system, and send the data packet or cell to the at least one switching node SW. The at least one switching node SW may be configured to perform switching based on destination information (for example, a destination IP address, a destination port, a destination node, or other information) of the received data packet or cell, and send a switched data packet or cell to a corresponding destination node D. For the destination node D, the one or more ports are output ports (output ports), and the output port may be configured to send, to the outside of the switching system, a data packet or cell that has been switched.

Optionally, the data switching network may be configured to implement switching of a variable-length packet (variable-length packet), or may be configured to implement switching of a fixed-length cell (cell). Further, when receiving a data packet, the source node S may maintain an original format of the variable-length packet for sending the data packet, or may split the data packet into cells (cells) for sending the data packet. If the source node S sends the data packet in the form of splitting the data packet into the cells, the destination node D may reassemble the complete data packet after receiving all the cells.

It should be noted that, in FIG. 3, an example in which the source node S and the destination node D are two independent nodes is used for description. In actual application, the source node S and the destination node D may alternatively be a same node and have both an input port and an output port. FIG. 3 constitutes no limitation on this embodiment of this application.

In this embodiment of this application, the source node S, the destination node D, and the switching node SW may be dies (dies). For example, the source node S and the destination node D may be network processing (network processing, NP) dies (which may also be referred to as NP dies), and the switching node SW may be a switching die (which may also be referred to as an SW die). Therefore, the data switching network may be a communication chip (chip) including a plurality of NP dies and one or more SW dies, or a chip set obtained by combining and packaging a plurality of such communication chips. The following describes a structure of the communication chip in detail.

Figure 4:
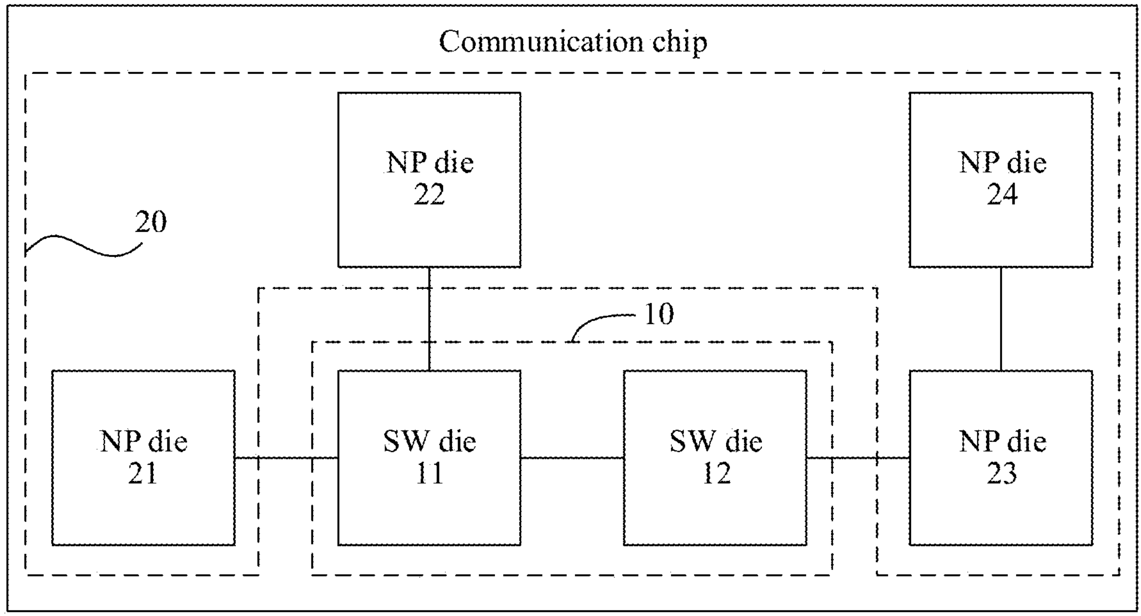
FIG. 4 is a diagram of a structure of a communication chip according to an embodiment of this application.

FIG. 4 is a diagram of a structure of a communication chip according to an embodiment of this application. The communication chip includes a plurality of SW dies 10 and a plurality of NP dies 20. Any one of the plurality of SW dies 10 is connected to another SW die. Any one of the plurality of NP dies 20 includes an internal port and an external port. The internal port is configured to be connected to another NP die, or to be connected to both the another NP die and an SW die. The external port may be configured to receive a packet from the outside, or send a packet to the outside. In FIG. 4, an example in which the plurality of SW dies 10 include two SW dies and the two SW dies are respectively represented as 11 and 12, and the plurality of NP dies 20 include four NP dies and the four NP dies are respectively represented as 21 to 24 is used for description.

The die may also be referred to as a bare die or an unpackaged die, so that the SW die may also be referred to as an SW bare die or an SW unpackaged die, and the NP die may also be referred to as an NP bare die or an NP unpackaged die. Optionally, the plurality of SW dies 10 and the plurality of NP dies 20 may be a plurality of independent dies cut from a wafer (wafer), or may be a plurality of uncut dies located on a same wafer.

In addition, for each of the plurality of NP dies 20, when the NP die is configured to receive a packet from the outside via the external port, the NP die may be referred to as a source NP die of the packet; or when the NP die is configured to output a packet to the outside via the external port, the NP die may be referred to as a destination NP die of the packet. A source NP die and a destination NP die of a same packet may be a same NP die, or may be different NP dies.

Any one (which may also be referred to as a second NP die, where an example in which the second NP die is represented as an NP die 21 is used below) of the plurality of NP dies 20 is configured to: receive a first packet from outside of the communication chip via the external port, obtain destination information of the first packet, and send a second packet via the internal port. The second packet includes the first packet and the destination information, and the destination information indicates a destination network processing die of the first packet. For example, the NP die 21 includes an external port (which may also be referred to as an input port), and may be configured to receive the first packet from outside the communication chip via the external port, and parse a destination address or a destination port of the first packet, to determine the destination information based on the destination address or the destination port. The destination information may be an identifier of a destination NP die corresponding to the destination address or the destination port. The NP die 21 may further send, via an internal port, the second packet including the first packet and the destination information. Optionally, each of the plurality of NP dies 20 may store a preset routing table corresponding to the communication chip. The preset routing table may be used for indicating routing information between any two of the plurality of NP dies 20, so that when obtaining, by parsing, the destination address or the destination port of the first packet, any NP die may determine and send the second packet based on corresponding routing information.

Any one of the plurality of SW dies 10 is configured to: receive the second packet, and send the second packet to a first NP die (for example, an NP die 22 or an NP die 23) in the plurality of NP dies 20 when determining, based on the destination information, that a preset condition is not satisfied, or send the second packet to a connected SW die when determining that the preset condition is satisfied. The preset condition includes: an SW die that is in the plurality of SW dies 10 and that is connected to the destination NP die, or an SW die that is connected to the destination NP die via the another NP die and that is connected to a minimum quantity of NP dies. Optionally, each of the plurality of SW dies 10 may also store a preset routing table corresponding to the communication chip, so that any SW die may determine, based on the preset routing table, whether the preset condition is satisfied, and send the second packet.

Optionally, as shown in FIG. 4, the plurality of SW dies 10 include a first SW die 11 and a second SW die 12, and the first SW die 11 is connected to the second SW die 12. Specifically, the first SW die 11 is configured to: receive the second packet, and send the second packet to the second SW die 12 when determining, based on the destination information, that the first SW die 11 does not satisfy the preset condition. The second SW die 12 is configured to: receive the second packet from the first SW die 11, and send the second packet to the first NP die 22 when determining, based on the destination information, that the second SW die 12 satisfies the preset condition.

Each of the plurality of SW dies 10 may include a plurality of switching ports. The plurality of switching ports may be connected to at least one NP die, or may be connected to at least one NP die and one or more other SW dies. Each SW die may switch a packet received by one switching port to another switching port for output. For example, assuming that the first SW die 11 includes a first switching port connected to the NP die 21, a second switching port connected to the NP die 22, and a third switching port connected to the second SW die 12, the first SW die 11 may perform the following steps: receiving the second packet from the NP die 21 via the first switching port; and switching the second packet from the first switching port to the second switching port when determining, based on the destination information, that the SW die 11 satisfies the preset condition (for example, the NP die 22 is the destination NP die, and the first SW die 11 is connected to the NP die 22), to send the second packet to the NP die 22 via the second switching port; or switching the second packet from the first switching port to the third switching port when determining, based on the destination information, that the first SW die 11 does not satisfy the preset condition (for example, the NP die 23 is the destination NP die, and the first SW die 11 is connected to the NP die 23 via the second SW die 12), to send the second packet to the second SW die 12 via the third switching port, so that the second SW die 12 sends the second packet to the NP die 23 when determining that the preset condition is satisfied.

The first NP die (where the NP die 23 is used as an example below) is configured to: receive the second packet from the connected SW die, and send the second packet to the outside via the external port, or send the second packet to the NP die via the internal port. For example, when the first NP die 23 receives the second packet from the switching die 12, if the destination NP die of the first packet is the first NP die 23, the first NP die 23 sends the second packet via the external port; or if the destination NP die of the first packet is not the first NP die 23, the first NP die 23 sends the second packet to the another NP die via the internal port. For example, the destination NP die of the first packet is an NP die 24, and the first NP die 23 sends the second packet to the NP die 24.

Figure 5:
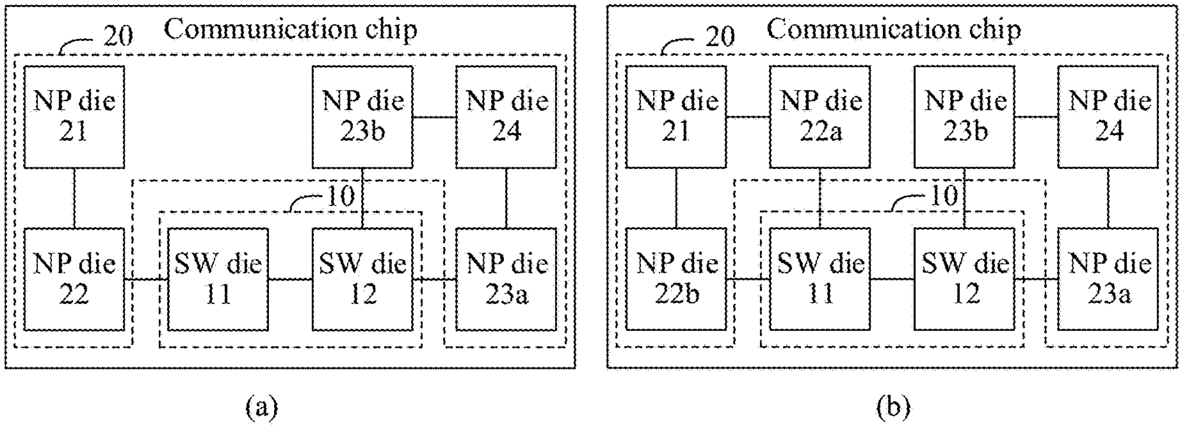
FIG. 5 is a diagram of a structure of another communication chip according to an embodiment of this application.

Further, with reference to FIG. 4, as shown in FIG. 5, if the destination NP die of the first packet is not the first NP die 23, the destination NP die of the first packet is not connected to any one of the plurality of SW dies 10, and at least two first NP dies 23 (where two NP dies are used as an example and are represented as 23*a* and 23*b*) in the plurality of NP dies 20 are connected to both the second SW die 12 and the destination NP die, in other words, there are a plurality of transmission paths between the second SW die 12 and the destination NP die, the second SW die 12 is specifically configured to: send the second packet to one of the at least two first NP dies 23 when sending the second packet to the first NP die 22. For example, the destination NP die is the NP die 24, and the second SW die 12 may send the second packet to the first NP die 23*a*, or the second SW die 12 sends the second packet to the first NP die 23*b*.

When there are the plurality of transmission paths between the second SW die 12 and the destination NP die of the first packet, the second SW die 12 may select, according to a specific traffic control policy, one transmission path from the plurality of transmission paths to transmit the second packet to the destination NP die. For example, the traffic control policy may include that one data flow is transmitted through one transmission path, one data flow is transmitted through a plurality of transmission paths in a load balancing manner, or the like. This is not specifically limited in this embodiment of this application.

Similarly, as shown in (a) in FIG. 5, if the second NP die 21 (namely, the source NP die) in the plurality of NP dies 20 is not connected to any one of the plurality of SW dies 10, the second NP die 21 is specifically configured to: send the second packet to the third NP die 22 via the internal port when receiving the first packet via the external port and sending the second packet via the internal port. The third NP die 22 is connected to both one (for example, the first SW die 11) of the plurality of SW dies 20 and the second NP die 21. Correspondingly, the third NP die 22 is configured to: receive the second packet, and forward the second packet to the first SW die 11.

Optionally, as shown in (b) in FIG. 5, if there are at least two third NP dies 22 (where two NP dies are used as an example and are represented as 22*a* and 22*b*) that are in the plurality of NP dies 20 and that are connected to both the second NP die 21 and the first SW die 11, in other words, there are a plurality of transmission paths between the second NP die 21 and the first SW die 11, the second NP die 21 is specifically configured to: send the second packet to one of the at least two third NP dies 22 when sending the second packet to the third NP die 22 via the internal port. For example, the second NP die 21 sends the second packet to the third NP die 22*a*, or the second NP die 21 sends the second packet to the third NP die 22*b*.

When there are the plurality of transmission paths between the second NP die 21 and the first SW die 11, the second NP die 21 may select, according to a specific traffic control policy, one transmission path from the plurality of transmission paths to transmit the second packet to the first SW die 11. For example, the traffic control policy may include that one data flow is transmitted through one transmission path, one data flow is transmitted through a plurality of transmission paths in a load balancing manner, or the like. This is not specifically limited in this embodiment of this application.

Further, the second SW die 12 may satisfy the preset condition, or may not satisfy the preset condition. When the second SW die 12 satisfies the preset condition, the second SW die 12 may send the second packet to a connected first NP die 23. When the second SW die 12 does not satisfy the preset condition, the second SW die 12 may send the second packet to another SW die connected to the second SW die 12, so that the another SW die sends the second packet to the connected first NP die 23.

Figure 6:
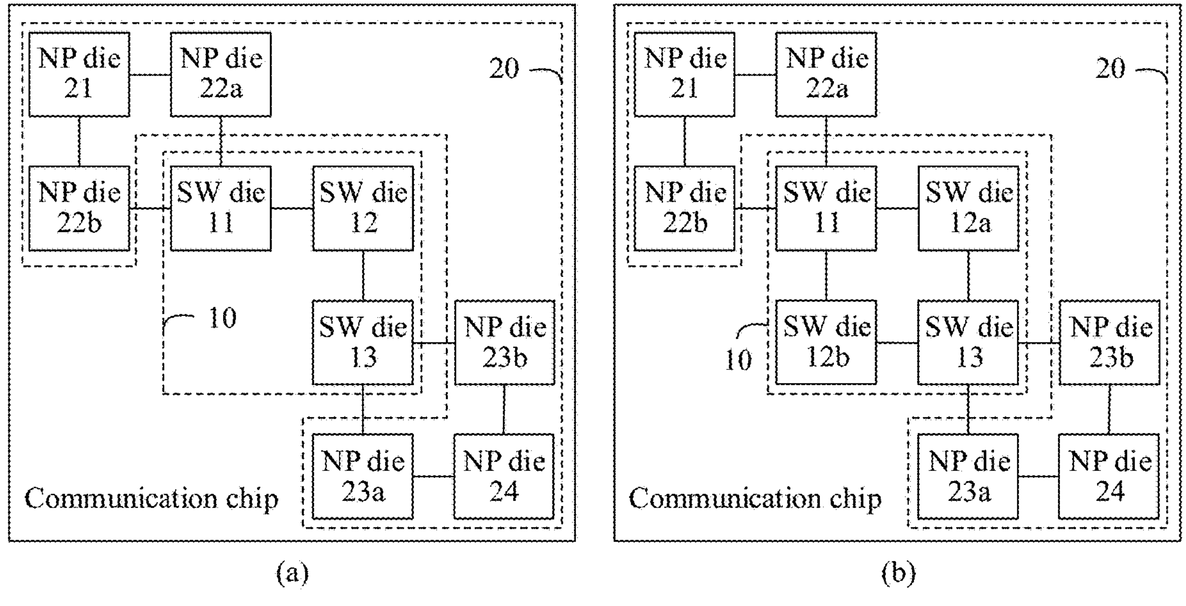
FIG. 6 is a diagram of a structure of still another communication chip according to an embodiment of this application.

In a possible embodiment, as shown in (a) in FIG. 6, if the plurality of SW dies 10 further include a third SW die 13, and the third SW die 13 is separately connected to the second SW die 12 and the first NP die 23, the second SW die 12 is further configured to: send the second packet to the third SW die 13 when determining that the second SW die 12 does not satisfy the preset condition. Correspondingly, the third SW die 13 is configured to: receive the second packet from the second SW die 12, determine, based on the destination information in the second packet, that the third SW die 13 satisfies the preset condition, and send the second packet to the first NP die 23.

Optionally, as shown in (b) in FIG. 6, if there are at least two second SW dies 12 (where two SW dies are used as an example and are represented as 12*a* and 12*b*) that are in the plurality of SW dies 10 and that are connected to both the first SW die 11 and the third SW die 23, in other words, there are a plurality of transmission paths between the first SW die 11 and the third SW die 23, the first SW die 11 is specifically configured to: send the second packet to one of the at least two second SW dies 12 when determining that the first SW die 11 does not satisfy the preset condition and needs to send the second packet to the second SW die 12. For example, the first SW die 11 sends the second packet to the second SW die 12*a*, or the first SW die 11 sends the second packet to the second SW die 12*b*.

Optionally, when there are the plurality of transmission paths between the first SW die 11 and the third SW die 23, the first SW die 11 may select, according to a specific traffic control policy, one transmission path from the plurality of transmission paths to transmit the second packet to the third SW die 23. For example, the traffic control policy may include that one data flow is transmitted through one transmission path, one data flow is transmitted through a plurality of transmission paths in a load balancing manner, or the like. This is not specifically limited in this embodiment of this application.

For any one of the foregoing possible embodiments, the first NP die 23 may be configured to send the second packet to the outside via the external port, and may be configured to send the second packet to the another NP die via the internal port. To ensure that the first NP die 23 can correctly transmit the second packet, an SW die (or referred to as an SW die that sends the second packet to the first NP die 23) connected to the first NP die 23 is further configured to: send path indication information to the first NP die 23. The path indication information indicates a sending path of the second packet. Correspondingly, the first NP die 23 is further configured to: receive the path indication information, and send the second packet to the outside based on the path indication information via the external port, or send the second packet to the another NP die based on the path indication information via the internal port. Further, when there are a plurality of NP dies in a transmission path between the SW die connected to the first NP die 23 and the destination NP die, the path indication information may further indicate a sending path of the second packet in the plurality of NP dies. In other words, the plurality of NP dies may forward the second packet based on the path indication information until the second packet is forwarded to the destination NP die.

In an example, the communication chip shown in FIG. 4 is used as an example. If the NP die 21 is a source NP die, the second packet sent by the NP die 21 reaches the second SW die 12 via the first SW die 11, the second SW die 12 determines that the preset condition is satisfied, and the second SW die 12 may send the second packet and the path indication information to the first NP die 23. If the destination NP die is the first NP die 23, the path indication information may indicate that the first NP die 23 sends the second packet to the outside via the external port. In this case, when receiving the second packet and the path indication information, the first NP die 23 sends the second packet to the outside via the external port. If the destination NP die is the NP die 24, the path indication information may indicate that the first NP die 23 forwards the second packet to the NP die 24 via the internal port. In this case, when receiving the second packet and the path indication information, the first NP die 23 forwards the second packet to the NP die 24 based on the path indication information.

In another example, the communication chip shown in FIG. 6 is used as an example. If the NP die 21 is a source NP die, the second packet sent by the NP die 21 reaches the third SW die 13 sequentially via the first SW die 11 and the second SW die 12, the third SW die 13 determines that the preset condition is satisfied, and the third SW die 13 may send the second packet and the path indication information to the first NP die 23*a*. If the destination NP die is the first NP die 23*a*, the path indication information may indicate that the first NP die 23*a* sends the second packet to the outside via the external port. In this case, when receiving the second packet and the path indication information, the first NP die 23*a* sends the second packet to the outside via the external port. If the destination NP die is the NP die 24, the path indication information may indicate that the first NP die 23*a* forwards the second packet to the NP die 24 via the internal port. In this case, when receiving the second packet and the path indication information, the first NP die 23*a* forwards the second packet to the NP die 24 based on the path indication information.

Figure 7A:
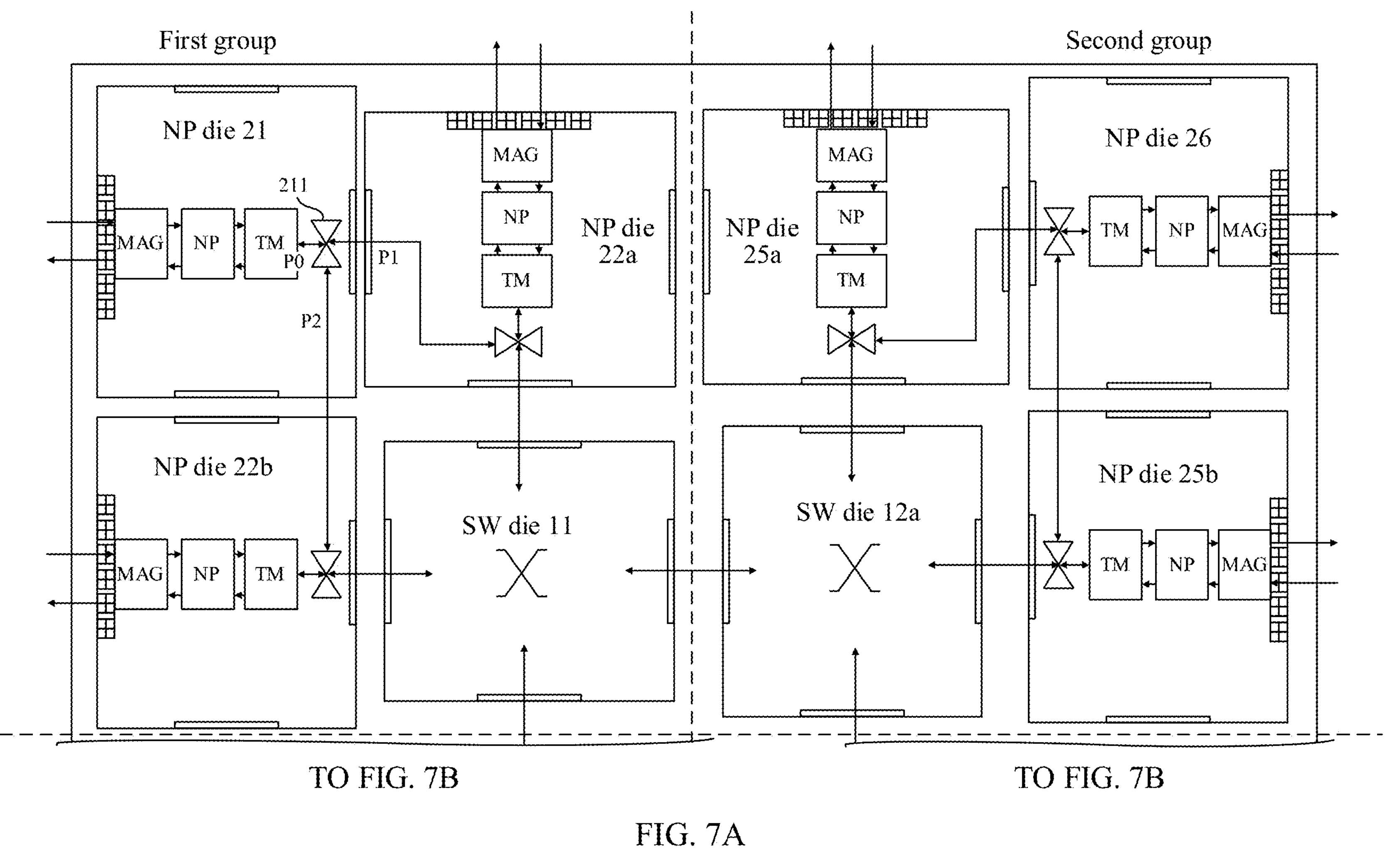
FIG. 7A and FIG. 7B are a diagram of a structure of another communication chip according to an embodiment of this application.
Figure 7B:
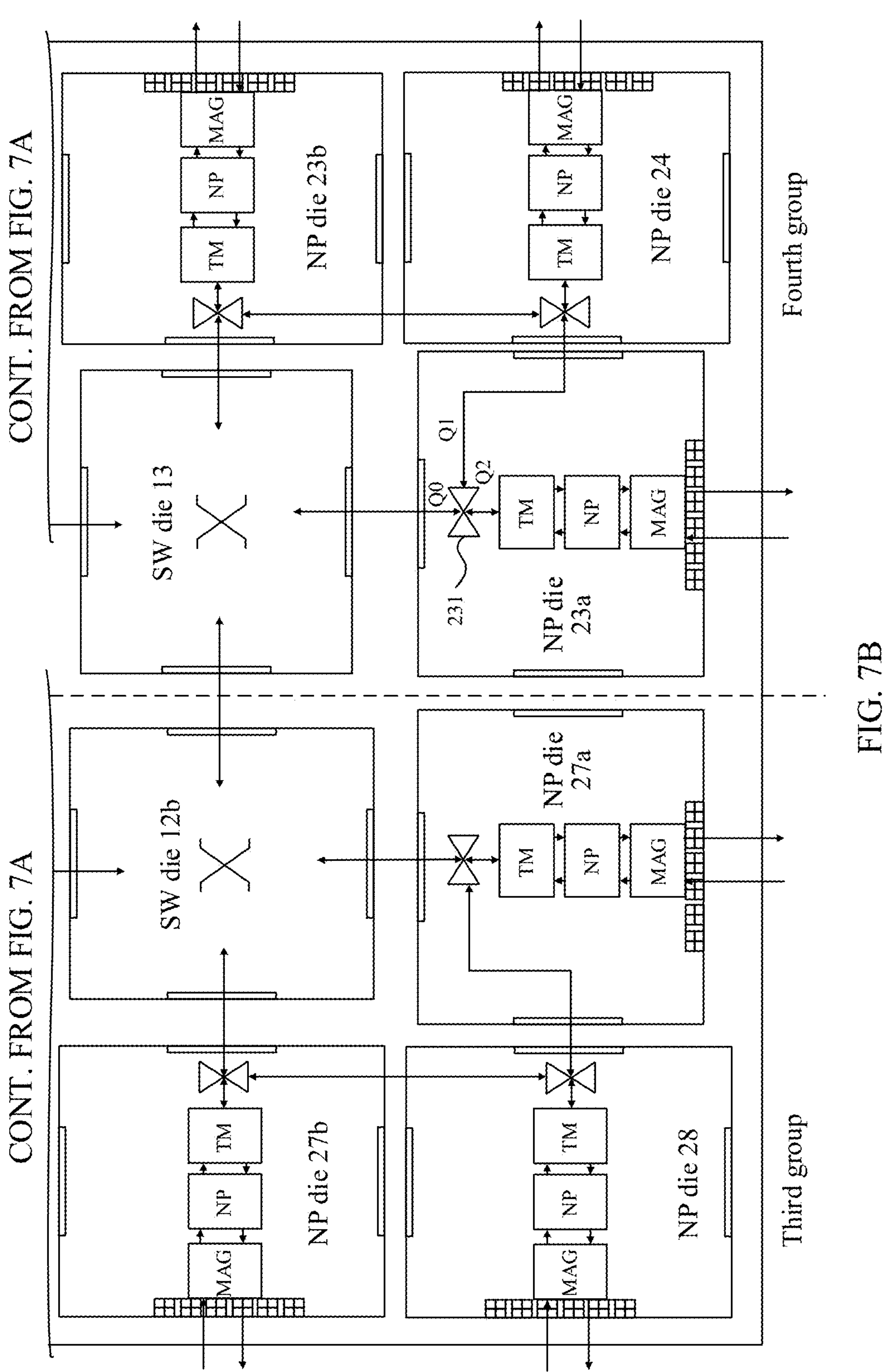

The following uses the communication chip shown in FIG. 7A and FIG. 7B as an example to describe a specific structure of the first NP die 23, an operation performed by the first NP die 23 based on the path indication information, a specific structure of the second NP die 21, and an operation performed by the second NP die 21 to select a transmission path. As shown in FIG. 7A and FIG. 7B, the communication chip may include four SW dies and 12 NP dies, the four SW dies are respectively represented as 11, 12*a*, 12*b*, and 13, and the 12 NP dies are respectively represented as 21, 22*a*, 22*b*, 23*a*, 23*b*, 24, 25*a*, 25*b*, 26, 27*a*, 27*b*, and 28. The SW die 11 and the SW die 13 are connected to both the SW die 12*a* and the SW die 12*b*. The NP die 21 is connected to the SW die 11 separately via the NP dies 22*a* and 22*b*. The NP die 24 is connected to the SW die 13 separately via the NP dies 23*a* and 23*b*. The NP die 26 is connected to the SW die 12*a* separately via the NP dies 25*a* and 25*b*. The NP die 28 is connected to the SW die 12*b* separately via the NP dies 27*a* and 27*b*.

First, a specific structure of the first NP die 23 and an operation performed by the first NP die 23 based on the path indication information are used as an example for description.

In a possible embodiment, as shown in FIG. 7A and FIG. 7B, an example in which the first NP die 23 is an NP die 23*a* is used. The first NP die 23*a* includes a first selector switch 231. The first selector switch 231 includes a connection end Q0, a first selection end Q1, and a second selection end Q2. The connection end Q0 of the first selector switch 231 is connected to the third SW die 13. The first selection end Q1 and the second selection end Q2 of the first selector switch 231 are respectively connected to the external port of the first NP die 23*a* and the NP die 24.

Specifically, an example in which the third SW die 13 sends the second packet and the path indication information to the first NP die 23*a* is used. If the destination NP die is the first NP die 23*a*, when the path indication information indicates that the first NP die 23*a* sends the second packet to the outside via the external port, the first NP die 23*a* may connect the connection end Q0 of the first selector switch 231 to the first selection end Q1 of the first selector switch 231. If the destination NP die is the NP die 24, when the path indication information indicates that the first NP die 23*a* forwards the second packet to the NP die 24 via the internal port, the first NP die 23*a* may connect the connection end Q0 of the first selector switch 231 to the second selection end Q2 of the first selector switch 231.

Optionally, the first selector switch 231 may further include at least two second selection ends Q2. The at least two second selection ends Q2 are respectively connected to at least two internal ports of the first NP die 23*a*. The at least two internal ports are respectively connected to at least two of the plurality of NP dies 20. In this case, the first NP die 23 is further configured to: when forwarding the second packet to the another NP die based on the path indication information via the internal port, connect the connection end of the first selector switch 221 to the second selection end Q2 corresponding to a sending path indicated by the path indication information.

Second, a specific structure of the second NP die 21 and an operation performed by the second NP die 21 to select a transmission path are used as an example for description.

In a possible embodiment, as shown in FIG. 7A and FIG. 7B, the second NP die 21 includes a second selector switch 211. The second selector switch 211 includes a connection end P0 and at least two selection ends P1 to Pi (i is a positive integer greater than 1). The connection end P0 of the second selector switch 211 is connected to an external port of the NP die 21. The at least two selection ends P1 to Pi of the second selector switch 211 are respectively connected to the at least two NP dies. In FIG. 7A and FIG. 7B, an example in which the at least two NP dies include the two NP dies that are represented as: 22*a* and 22*b*, the at least two selection ends P1 to Pi include two selection ends that are represented as P1 and P2, the NP die 22*a* is connected to the selection end P1, and the NP die 22*b* is connected to the selection end P2 is used for description.

Specifically, the second NP die 21 is further configured to: control the connection end P0 of the second selector switch 211 to be connected to one of the at least two selection ends P1 to Pi of the second selector switch 211, to select one of the at least two NP dies to send the second packet. For example, with reference to FIG. 7A and FIG. 7B, the NP die 21 may be configured to control the connection end P0 of the second selector switch 211 to be connected to the selection end P1 of the second selector switch 211, to select the NP die 22*a* from the NP die 22*a* and the NP die 22*b* to send the second packet. In other words, the NP die 21 selects to forward the second packet to the first SW die 11 via the NP die 22*a*.

Optionally, in addition to the selector switch, the NP die 21 and the first NP die 23*a* may further include other functional units. For example, the NP die 21 and the first NP die 23*a* may further include a media access control (media access control) aggregation (aggregation) unit, a network processor (network processor, NP), and a traffic manager (traffic manager, TM). The media access control aggregation unit may be referred to as an MAG for short. The MAG may be configured to sense an optical signal or an electrical signal, forward the optical signal or the electrical signal as a data frame (namely, a packet), and perform validity check on the data frame. Uplink processing of the NP may include packet parsing, data stream analysis, packet forwarding, mapping a MAC/IP address to a TM queue number, and the like. Downlink processing of the NP may include packet encapsulation, egress processing, and the like. The TM may be configured to provide functions such as large-capacity memory, congestion avoidance, traffic shaping, multi-level traffic scheduling, and traffic congestion control, and map the TM queue number to an identifier of a destination NP die.

Similarly, any one of the plurality of NP dies shown in FIG. 7A and FIG. 7B may include a media access control aggregation unit MAG, a network processor NP, and a traffic manager TM. Further, when any one of the plurality of NP dies may be configured to receive a packet from the outside or forward a packet to the outside, and may be configured to forward a packet for the another NP die or the SW die, the NP die may further include a selector switch similar to the first selector switch 231 or the second selector switch 211. This is not specifically limited in this embodiment of this application.

In addition, in addition to the 4 SW dies and the 12 NP dies shown in FIG. 7A and FIG. 7B, the plurality of NP dies 20 may further include more SW dies and NP dies. Any SW die may be connected to other SW dies, and any NP die may be connected to other NP dies, or may be connected to other NP dies and SW dies at the same time. Each connected NP die includes a selector switch, a MAG, an NP, and a TM.

It should be noted that the foregoing related descriptions of the NP die 21 to the NP die 24 are all described by using different angles of the NP dies in data switching as examples. In the communication chip, any one of the plurality of NP dies 10 may perform a function of any one of the NP die 21 to the NP die 24. This is specifically related to a packet that needs to be switched and a location (or referred to as a connection relationship) of the NP die in the communication chip.

Optionally, when the NP die includes a plurality of different functional units such as the selector switch, the media access control aggregation unit MAG, the network processor NP, and the traffic manager TM, the NP die may alternatively be split into a plurality of different dies, and each die is configured to correspond to the foregoing one or more functional units. For example, each NP die may include two dies, and the two dies include a die corresponding to the MAG, and a die corresponding to the NP, the TM, and the selector switch.

In this embodiment of this application, structures of the plurality of SW dies 10 may be the same or different. Similarly, structures of the plurality of NP dies 20 may be the same or different. When the structures of the plurality of SW dies 10 are the same, or the structures of the plurality of NP dies 20 are the same, a plurality of identical dies may be obtained through one flow-out process or a same flow-out process, and SW dies or NP dies at different locations in the communication chip may be obtained by configuring and rotating the plurality of dies. In this case, development costs of the SW dies and the NP dies are greatly reduced.

Further, when the source NP die and the destination NP die of the first packet are a same NP die, the source NP die may be further configured to send the first packet via the external port. For example, the second NP die 21 in the communication chip provided in any one of FIG. 4 to FIG. 7A and FIG. 7B is used as an example. If both the source NP die and the destination NP die of the first packet are the second NP die 21, the second NP die 21 may be further configured to: send the first packet via the external port when receiving the first packet and determining that the destination NP die is the second NP die 21.

In addition, when the source NP die and the destination NP die of the first packet are two connected NP dies, the source NP die may be further configured to send the first packet to the destination NP die via the internal port. For example, the second NP die 21 and the NP die 22*a* in FIG. 5 or FIG. 6 are used as an example. The second NP die 21 is further configured to: send the first packet to the NP die 22*a* via the internal port when receiving the first packet and determining that the destination NP die is the NP die 22*a*.

Further, the communication chip may further include a plurality of groups, and any one of the plurality of groups includes at least one of the plurality of NP dies 20 and/or at least one of the plurality of SW dies 10. In a possible embodiment, any one of the plurality of groups includes the at least one SW die of the plurality of SW dies 10, or any one of the plurality of groups includes the at least one SW die and the at least one NP die of the plurality of SW dies 10. Any one of the at least one NP die is connected to one SW die in a same group via the internal port, or is connected to an adjacent NP die in the same group via the internal port.

For example, the communication chip shown in FIG. 7A and FIG. 7B is used as an example. The communication chip may include four groups. A first group may include an SW die 11, an NP die 21, an NP die 22*a*, and an NP die 22*b*. A second group may include an SW die 12*a*, an NP die 26, an NP die 25*a*, and an NP die 25*b*. A third group may include an SW die 12*b*, an NP die 28, an NP die 27*a*, and an NP die 27*b*. A fourth group may include an SW die 13, an NP die 24, an NP die 23*a*, and an NP die 23*b*.

Optionally, when two adjacent NP dies in the plurality of NP dies 20 belong to different groups, the two adjacent NP dies may not be connected. For example, the four groups shown in FIG. 7A and FIG. 7B are used as an example. The NP die 22*a* and the NP die 25*a* may not be connected, the NP die 22*b* and the NP die 27*b* may not be connected, the NP die 25*b* and the NP die 23*b* may not be connected, and the NP die 27*a* and the NP die 23*a* may not be connected. In actual application, when the two adjacent NP dies in the plurality of NP dies 20 belong to different groups, the two adjacent NP dies may also be connected. In FIG. 7A and FIG. 7B, only an example in which the two adjacent NP dies in the different groups are not connected is used for description.

In a possible embodiment, when both the source NP die and the destination NP die belong to one group, a packet received by the source NP die may be transmitted to the destination NP die via the NP die and/or the SW die in the group. When the source NP die and the destination NP die belong to different groups, a packet received by the source NP die may be transmitted to the destination NP die via the NP die and/or the SW die in the plurality of groups.

Figure 8:
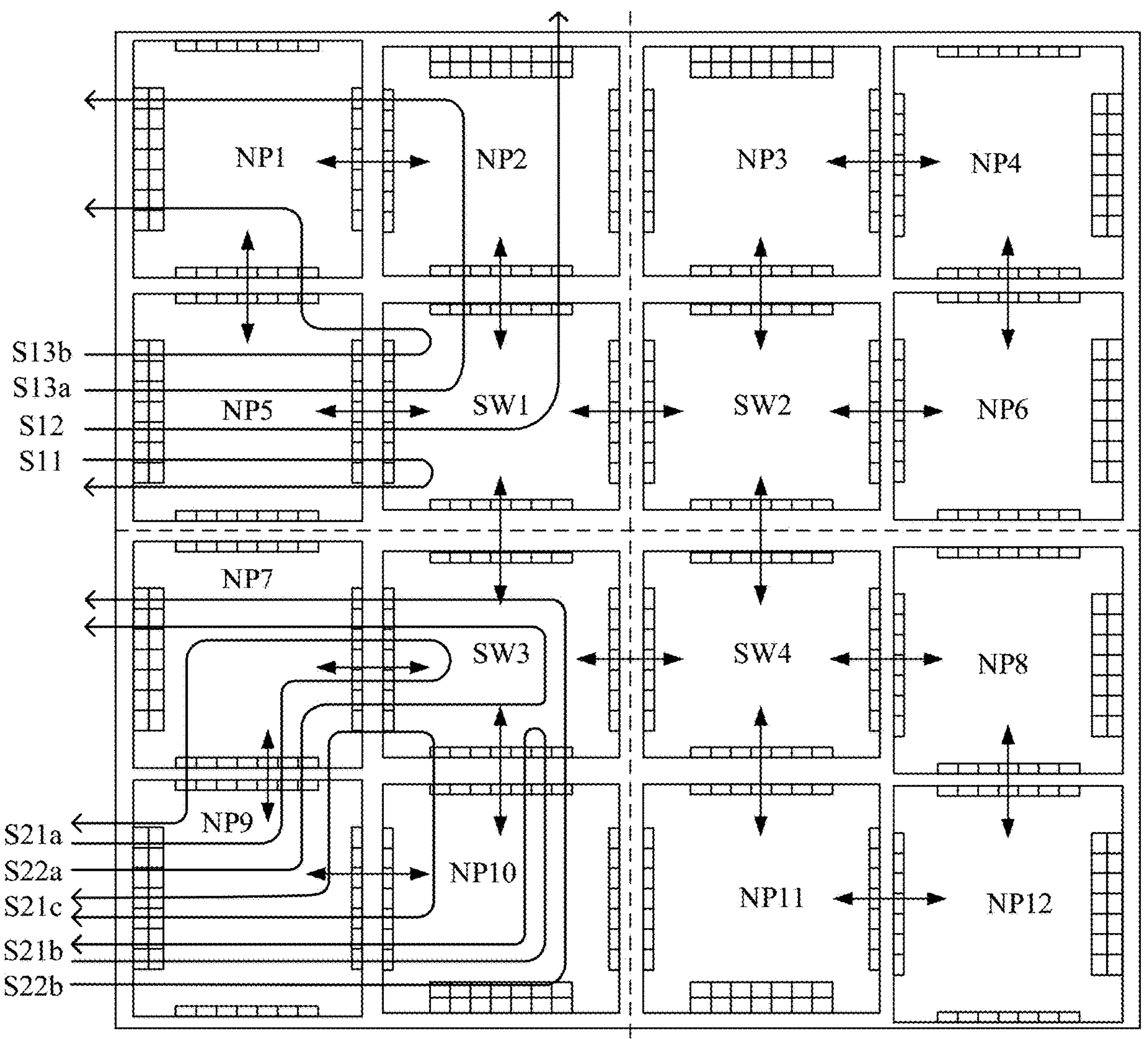
FIG. 8 is a diagram of a type of data switching according to an embodiment of this application.
Figure 9:
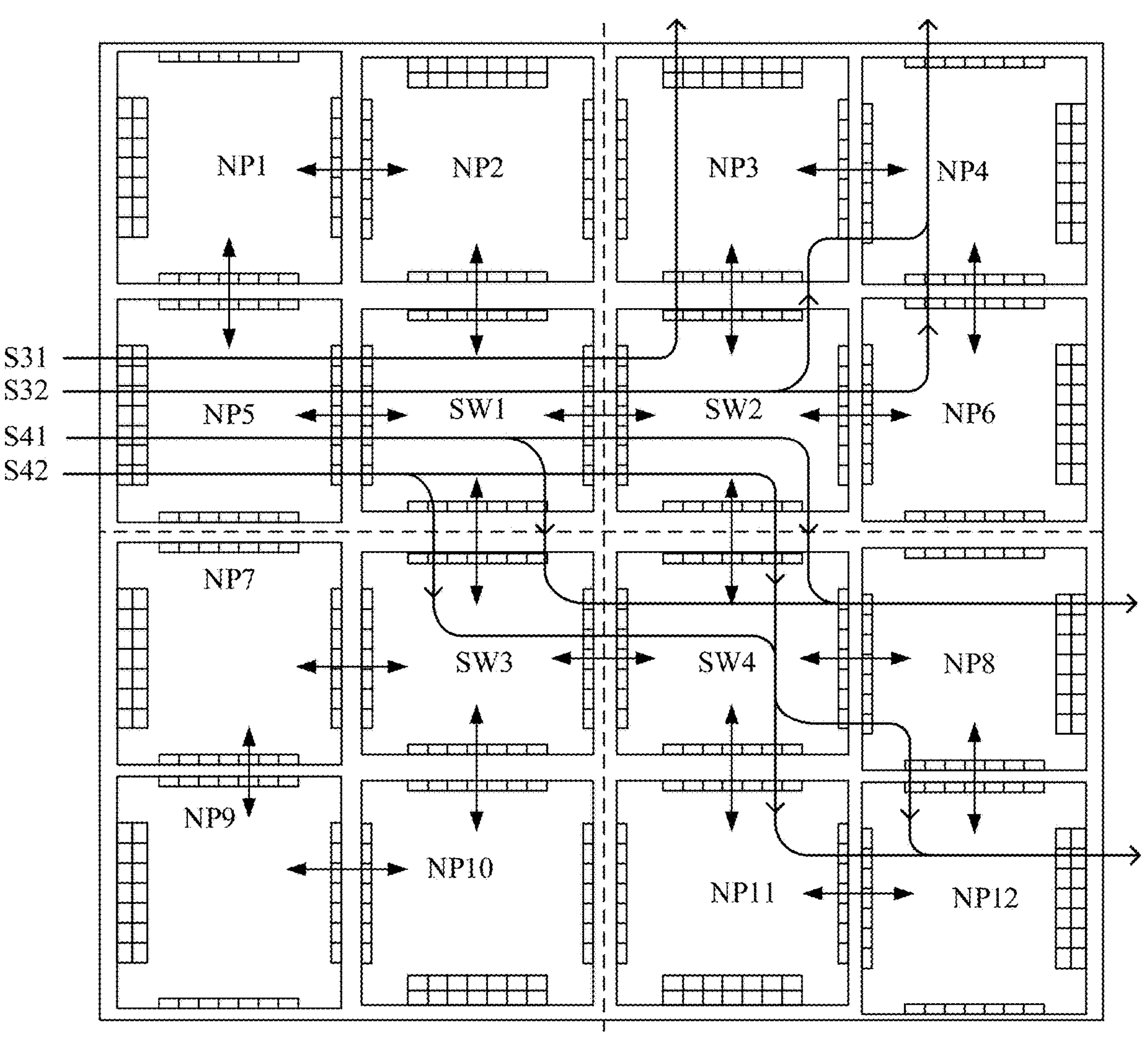
FIG. 9 is a diagram of another type of data switching according to an embodiment of this application.
Figure 10:
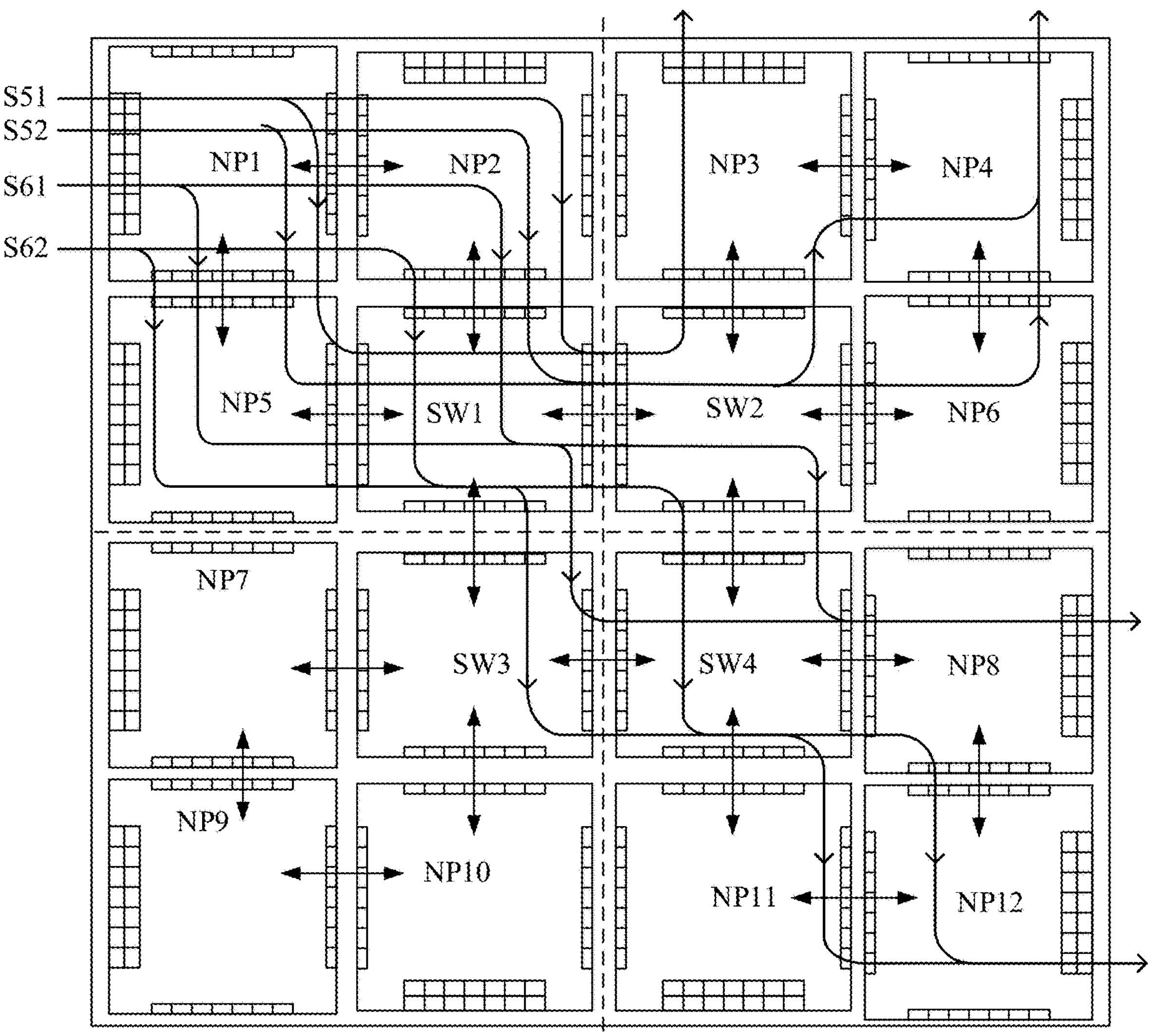
FIG. 10 is a diagram of still another type of data switching according to an embodiment of this application.

For ease of understanding, the following uses the communication chip shown in FIG. 8 to FIG. 10 as an example to describe switching paths corresponding to packets of NP dies at different locations in the communication chip. The different locations may include that a source NP die and a destination NP die belong to a same group and different groups. The source NP die is an NP die directly connected to the SW die (referred to as a directly connected NP die for short), the source NP die is an NP die not directly connected to the SW die (referred to as an indirectly connected NP die for short), and the destination NP die is a directly connected NP die and an indirectly connected NP die. In FIG. 8 to FIG. 10, an example in which the communication chip includes four SW dies (represented as SW1 to SW4) and 12 NP dies (represented as NP1 to NP12) is used. SW1 to SW4 and NP1 to NP12 are divided into four groups. Each group includes one SW die, two directly connected NP dies, and one indirectly connected NP die.

In a possible example, as shown in FIG. 8, a possible switching path in which both the source NP die and the destination NP die belong to a same group, and the source NP die is a directly connected NP die (for example, the source NP die is NP5 directly connected to SW1) is used as an example for description. Specifically, if the destination NP die is a directly connected NP die, for example, NP5, a switching path S11 corresponding to a packet is NP5-SW1-NP5, and, for example, NP2, a switching path S12 corresponding to the packet is NP5-SW1-NP2. If the destination NP die is an indirectly connected NP die, for example, NP1, a switching path S13*a* corresponding to the packet is NP5-SW1-NP2-NP1, or the switching path S13*b* is NP5-SW1-

NP5-NP1. A possible switching path in which both the source NP die and the destination NP die belong to a same group and the source NP die is an indirectly connected NP die (for example, the source NP die is NP9 directly connected to SW3) is used as an example for description. Specifically, if the destination NP die is an indirectly connected NP die, for example, NP9, a switching path S21*a* of the packet is NP9-NP7-SW3-NP7-NP9, a switching path S21*b* is NP9-NP10-SW3-NP10-NP9, or a switching path S21*c* is NP9-NP7-SW3-NP10-NP9 or NP9-NP10-SW3-NP7-NP9. If the destination NP die is a directly connected NP die, for example, NP7, a switching path S22*a* of the packet is NP9-NP7-SW3-NP7, or a switching path S22*b* is NP9-NP10-SW3-NP7.

In a possible example, as shown in FIG. 9, a possible switching path in which the source NP die and the destination NP die belong to different groups, and the source NP die is a directly connected NP die (for example, the source NP die is NP5 directly connected to SW1) is used as an example for description. Specifically, an example in which two groups to which the source NP die and the destination NP die belong are adjacent is used. If the destination NP die is a directly connected NP die, for example, NP3, a switching path S31 of the packet is NP5-SW1-SW2-NP3. If the destination NP die is an indirectly connected NP die, for example, NP4, a switching path S32 of the packet is NP5-SW1-SW2-NP6/NP3-NP4. For example, two groups to which the source NP die and the destination NP die belong are not adjacent. If the destination NP die is a directly connected NP die, for example, NP8, a switching path S41 of the packet is NP5-SW1-SW2/SW3-SW4-NP8. If the destination NP die is an indirectly connected NP die, for example, NP12, a switching path S42 of the packet is NP5-SW1-SW2/SW3-SW4-NP8/NP11-NP12.

In still another possible example, as shown in FIG. 10, a possible switching path in which the source NP die and the destination NP die belong to different groups and the source NP die is an indirectly connected NP die (for example, the source NP die is NP1) is used as an example for description. Specifically, an example in which two groups to which the source NP die and the destination NP die belong are adjacent is used. If the destination NP die is a directly connected NP die, for example, NP3, a switching path S51 of the packet is NP1-NP5/NP2-SW1-SW2-NP3. If the destination NP die is an indirectly connected NP die, for example, NP4, a switching path S52 of the packet is NP1-NP5/NP2-SW1-SW2-NP6/NP3-NP4. For example, two groups to which the source NP die and the destination NP die belong are not adjacent. If the destination NP die is a directly connected NP die, for example, NP8, a switching path S61 of the packet is NP1-NP5/NP2-SW1-SW2/SW3-SW4-NP8. If the destination NP die is an indirectly connected NP die, for example, NP12, a switching path S62 of the packet is NP1-NP5/NP2-SW1-SW2/SW3-SW4-NP8/NP11-NP12.

It should be noted that, in FIG. 8 to FIG. 10, an example in which the source NP die and the destination NP die are a same NP die or two adjacent NP dies in a same group, and a corresponding switching path needs to pass through an SW die is used for description. Optionally, when the source NP die and the destination NP die are the same NP die, or are the two adjacent NP dies in the same group, the corresponding switching path may alternatively not pass through the SW die, and is directly outputted through an NP die. For example, an example in which both the source NP die and the destination NP die are NP4 is used. When receiving a packet and determining that the destination NP die of the packet is NP4, NP4 may output the packet via a corresponding external port for output.

FIG. 4 to FIG. 10 are merely examples. When the communication chip is configured to implement data switching of a larger capacity, the communication chip may further include more NP dies and more SW dies. The plurality of NP dies may be configured to receive the packet from the outside, or send the packet to the outside. Some of the plurality of NP dies may be further configured to forward a packet for another part of NP dies, to forward the packet received by the source NP die to the plurality of SW dies. Some of the plurality of NP dies may be further configured to forward a packet for the plurality of SW dies, to forward the packet to a destination NP die. Each of the plurality of SW dies may be configured to switch a packet, and different SW dies may be further configured to forward a packet. In addition, when the communication chip includes more NP dies and more SW dies, types and quantities of dies included in a plurality of groups of the communication chip may be the same or may be different.

Figure 11:
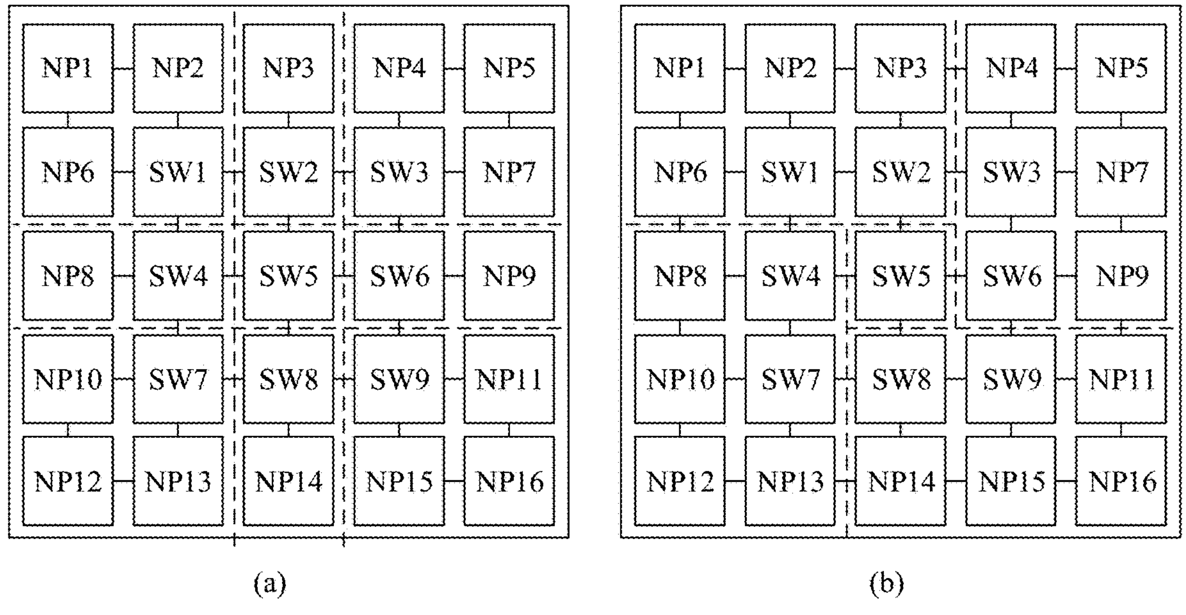
FIG. 11 is a diagram of a structure of another communication chip according to an embodiment of this application.

In a possible embodiment, as shown in FIG. 11, a communication chip may include nine SW dies (represented as SW1 to SW9) and 16 NP dies (represented as NP1 to NP16). Each SW die may be connected to at least one NP die, and each SW die may be further connected to at least one SW die. Each NP die may be connected to one SW die, connected to at least one NP die, or connected to both one SW die and at least one NP die. In an example, as shown in (a) in FIG. 11, the communication chip may include nine groups. Each of four groups may include three NP dies and one SW die. Each of the other four groups may include one NP die and one SW die, and a last group may include one SW die. Alternatively, in another example, as shown in (b) in FIG. 11, the communication chip may include five groups. Each of the four groups may include four NP dies and one SW die, and a last group may include one SW die.

The plurality of groups shown in FIG. 11 are merely examples. In actual application, the plurality of groups may be further divided in another manner. This is not specifically limited in this embodiment of this application. In addition, in (a) in FIG. 11, an example in which two adjacent NP dies belong to different groups and the two adjacent NP dies are not connected is used for description. In (b) in FIG. 11, an example in which two adjacent NP dies belong to different groups and the two adjacent NP dies are connected is used for description.

Further, the communication chip may further include at least one storage die, and any one of the plurality of NP dies is connected to one or more of the at least one storage die. Optionally, the communication chip includes a plurality of storage dies, and the plurality of storage dies are in one-to-one correspondence with the plurality of NP dies. In other words, each NP die is connected to a corresponding storage die. Optionally, a storage medium type of the storage die includes, but is not limited to: a dynamic random access memory (dynamic random access memory, DRAM), a static random access memory (static random access memory, SRAM), a ferroelectric random access memory (ferroelectric random access memory, FeRAM), a magnetic random access memory (magnetic random access memory, MRAM), or the like.

When the at least one storage die includes the plurality of storage dies, storage medium types of the plurality of storage dies may be the same or different. When one NP die is coupled to the plurality of storage dies, the storage medium types of the plurality of storage dies correspondingly coupled to the NP die may be the same or different. This is not specifically limited in this embodiment of this application.

In this embodiment of this application, the communication chip includes the plurality of SW dies and the plurality of NP dies, and the plurality of SW dies and the plurality of NP dies may be connected in the communication chip. In addition, the plurality of NP dies may be configured to receive the packet from the outside or send the packet to the outside, and the plurality of SW dies may be configured to implement packet switching, so that data switching can be implemented inside the communication chip. In comparison with a data switching network including a plurality of NP chips and a plurality of switching chips in the conventional technology, a volume and power consumption can be greatly reduced, and heat dissipation costs and deployment space of a device using the communication chip can be reduced, to meet a current requirement for green, low-carbon, and sustainable development.

Based on this, an embodiment of this application further provides a data switching apparatus. The data switching apparatus includes a backplane and at least one communication chip disposed on the backplane, and the communication chip is any communication chip mentioned above. Optionally, the data switching apparatus may be a switching box or a switching frame. When the data switching apparatus is the switching box, the data switching apparatus may be in a single-device form and does not support capacity expansion, so that no backplane interface may be disposed on the backplane. When the data switching apparatus is the switching frame, the data switching apparatus may not be in a single-device form and supports capacity expansion, so that a corresponding backplane interface may be disposed on the backplane.

In an example, when the data switching apparatus is the switching frame, the switching frame includes at least one line card corresponding to the at least one communication chip, and the at least one communication chip is connected to the backplane interface on the backplane respectively by using the at least one line card, to dispose the at least one communication chip on the backplane.

Based on this, an embodiment of this application further provides a switching device. The switching device may be a router or a switch, and the switching device includes the data switching apparatus provided above.

It should be noted that all the foregoing detailed descriptions about the communication chip may be correspondingly cited in the data switching apparatus and the switching device. Details are not described in embodiments of this application again.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A communication chip, wherein the communication chip comprises: a plurality of switching dies and a plurality of network processing dies, any one of the plurality of switching dies is connected to another switching die, any one of the plurality of network processing dies comprises an external port and an internal port, and wherein the internal port is connected to another network processing die, or the internal port is connected to both another network processing die and one of the plurality of switching dies; and wherein:

any one of the plurality of network processing dies is configured to:

receive a first packet from outside of the communication chip via the external port;

obtain destination information of the first packet; and send a second packet via the internal port, wherein the second packet comprises the first packet and the destination information, and the destination information indicates a destination network processing die of the first packet;

any one of the plurality of switching dies is configured to:

receive the second packet; and send the second packet to a connected switching die when determining, based on the destination information, that a preset condition is not satisfied; or send the second packet to a connected first network processing die when determining that the preset condition is satisfied; and the first network processing die is configured to:

receive the second packet from the connected switching die; and send the second packet to outside via the external port; or send the second packet to the another network processing die via the internal port, wherein the preset condition comprises:

the any one of the plurality of switching dies is a switching die in the plurality of switching dies that is connected to the destination network processing die; or the any one of the plurality of switching dies is a switching die that is connected to the destination network processing die via the another network processing die and that is connected to a minimum quantity of connected network processing dies.

2. The communication chip according to claim 1, wherein:

the plurality of switching dies comprise a first switching die and a second switching die, and the second switching die is connected to the first switching die; and the first switching die is configured to:

receive the second packet; and send the second packet to the second switching die when determining, based on the destination information, that the first switching die does not satisfy the preset condition; and the second switching die is configured to:

receive the second packet from the first switching die; and send the second packet to the first network processing die when determining, based on the destination information, that the second switching die satisfies the preset condition.

3. The communication chip according to claim 2, wherein:

the plurality of switching dies further comprise a third switching die, and the third switching die is connected to the second switching die;

the second switching die is further configured to: send the second packet to the third switching die when determining that the second switching die does not satisfy the preset condition; and the third switching die is configured to:

receive the second packet from the second switching die; and send the second packet to the first network processing die when determining, based on the destination information, that the third switching die satisfies the preset condition.

4. The communication chip according to claim 3, wherein there are at least two second switching dies that are in the plurality of switching dies and that are connected to both the first switching die and the third switching die; and the first switching die is configured to: send the second packet to one of the at least two second switching dies when sending the second packet to the second switching die.

5. The communication chip according to claim 2, wherein the destination network processing die is not connected to any one of the plurality of switching dies, and there are at least two first network processing dies that are in the plurality of network processing dies and that are connected to both the second switching die and the destination network processing die; and the second switching die is further configured to: send the second packet to one of the at least two first network processing dies when sending the second packet to the first network processing die.

6. The communication chip according to claim 1, wherein:

any one of the plurality of switching dies is further configured to: send path indication information to the first network processing die when sending the second packet to the first network processing die, wherein the path indication information indicates a sending path of the second packet; and the first network processing die is further configured to:

receive the path indication information; and send the second packet to the outside based on the path indication information via the external port; or send the second packet to the another network processing die based on the path indication information via the internal port.

7. The communication chip according to claim 6, wherein:

the first network processing die comprises a first selector switch, wherein the first selector switch comprises a connection end, a first selection end, and a second selection end, wherein the connection end of the first selector switch is connected to one of the plurality of switching dies, the first selection end of the first selector switch is connected to the external port, and the second selection end of the first selector switch is connected to the another network processing die; and the first network processing die is further configured to:

connect the connection end of the first selector switch to the first selection end of the first selector switch when sending the second packet to the outside based on the path indication information via the external port; or connect the connection end of the first selector switch to the second selection end of the first selector switch when sending the second packet to the another network processing die based on the path indication information via the internal port.

8. The communication chip according to claim 7, wherein:

the first selector switch comprises at least two second selection ends, the at least two second selection ends are respectively connected to at least two internal ports of the first network processing die, and the at least two internal ports are respectively connected to at least two of the plurality of network processing dies; and the first network processing die is further configured to: when sending the second packet to the another network processing die based on the path indication information via the internal port, connect the connection end of the first selector switch to the second selection end corresponding to the sending path indicated by the path indication information.

9. The communication chip according to claim 1, wherein:

there is a second network processing die in the plurality of network processing dies that is not connected to any one of the plurality of switching dies; and the second network processing die is configured to: send the second packet to a third network processing die via the internal port after receiving the first packet via the external port and sending the second packet via the internal port, wherein the third network processing die is connected to both one of the plurality of switching dies and the second network processing die; and the third network processing die is configured to:

receive the second packet; and forward the second packet to the switching die.

10. The communication chip according to claim 9, wherein:

there are at least two third network processing dies in the plurality of network processing dies; and the second network processing die is configured to: send the second packet to one of the at least two third network processing dies when sending the second packet to the third network processing die via the internal port.

11. The communication chip according to claim 10, wherein:

the second network processing die further comprises a second selector switch, the second selector switch comprises a connection end and at least two selection ends, the connection end of the second selector switch is connected to the external port, and the at least two selection ends of the second selector switch are respectively connected to the at least two third network processing dies; and the second network processing die is further configured to: connect the connection end of the second selector switch to one of the at least two selection ends, to send the second packet to one third network processing die selected from the at least two third network processing dies.

12. The communication chip according to claim 11, wherein the second network processing die is further configured to: send the first packet via the external port when the destination network processing die is the second network processing die.

13. The communication chip according to claim 1, wherein the communication chip comprises a plurality of groups, any one of the plurality of groups comprises at least one of the plurality of network processing dies, and network processing dies in any two of the plurality of groups are not connected, wherein at least one network processing die in a same group is connected to one of the plurality of switching dies in the same group via the internal port, or at least one network processing die in a same group is connected to an adjacent network processing die in the same group via the internal port.

14. The communication chip according to claim 1, wherein the plurality of switching dies and the plurality of network processing dies are located in a same wafer.

15. The communication chip according to claim 1, wherein the communication chip further comprises: a plurality of storage dies, and any one of the plurality of network processing dies is connected to one or more of the plurality of storage dies.

16. A data switching apparatus, wherein the data switching apparatus comprises a backplane and at least one communication chip disposed on the backplane, wherein the at least one communication chip comprises: a plurality of switching dies and a plurality of network processing dies, and wherein:

any one of the plurality of switching dies is connected to another switching die, any one of the plurality of network processing dies comprises an external port and an internal port, wherein the internal port is connected to another network processing die, or the internal port is connected to both another network processing die and one of the plurality of switching dies; and any one of the plurality of network processing dies is configured to:

receive a first packet from outside of the communication chip via the external port;

obtain destination information of the first packet; and send a second packet via the internal port, wherein the second packet comprises the first packet and the destination information, and the destination information indicates a destination network processing die of the first packet;

any one of the plurality of switching dies is configured to:

receive the second packet; and send the second packet to a connected switching die when determining, based on the destination information, that a preset condition is not satisfied; or send the second packet to a connected first network processing die when determining that the preset condition is satisfied; and the first network processing die is configured to:

receive the second packet from the connected switching die; and send the second packet to outside via the external port; or send the second packet to the another network processing die via the internal port, wherein the preset condition comprises:

the any one of the plurality of network processing dies is a switching die in the plurality of switching dies that is connected to the destination network processing die; or the any one of the plurality of network processing dies is a switching die that is connected to the destination network processing die via the another network processing die and that is connected to a minimum quantity of connected network processing dies.

17. The data switching apparatus according to claim 16, wherein the data switching apparatus comprises a switching box or a switching frame.

18. The data switching apparatus according to claim 17, wherein the switching frame comprises at least one line card corresponding to the at least one communication chip when the data switching apparatus comprises the switching frame, and the at least one communication chip is disposed on the backplane by using the at least one line card.

19. The data switching apparatus according to claim 16, wherein:

the plurality of switching dies comprise a first switching die and a second switching die, and the second switching die is connected to the first switching die; and the first switching die is configured to:

receive the second packet; and send the second packet to the second switching die when determining, based on the destination information, that the first switching die does not satisfy the preset condition; and the second switching die is configured to:

receive the second packet from the first switching die; and send the second packet to the first network processing die when determining, based on the destination information, that the second switching die satisfies the preset condition.

20. The data switching apparatus according to claim 19, wherein:

the plurality of switching dies further comprise a third switching die, and the third switching die is connected to the second switching die;

the second switching die is further configured to: send the second packet to the third switching die when determining that the second switching die does not satisfy the preset condition; and the third switching die is configured to:

receive the second packet from the second switching die; and send the second packet to the first network processing die when determining, based on the destination information, that the third switching die satisfies the preset condition.

* * * * *